Patented May 25, 1943

2,319,791

UNITED STATES PATENT OFFICE 2,319,791

ABRASIVES

Loring Coes, Jr., Brookfield, Mass., assignor to Norton Company, Worcester, Mass., a corporation of Massachusetts No Drawing. Application July 23, 1942,
Serial No. 452,088

8 Claims. (Cl. 51—298)

The invention relates to grinding wheels and other solid abrasive compositions. With regard to its more specific features, the invention relates to grinding wheels or other solid abrasive articles bonded with organic bond, especially the polymerized condensation product of a primary aromatic amine with an aldehyde.

One object of the invention is to provide a superior plasticizer for abrasive grains for the manufacture of the foregoing type of abrasive composition. Another object of the invention is to provide an improved dry snagging wheel. Another object of the invention is to provide a grinding wheel or other solid abrasive article which, in various embodiments, may be substituted for abrasive articles bonded with shellac, rubber or phenol-formaldehyde, and which will remove a greater amount of metal for a given wheel wear.

Another object of the invention is to provide an ingredient for assisting the conversion of an aromatic amine-aldehyde resin, particularly aniline-formaldehyde, to the infusible condition. Another object of the invention is to provide a mixing plasticizer for abrasive grains having properties superior to furfural for the manufacture of the type of abrasive articles indicated. Another object of the invention is to provide a mixing plasticizer which does not react to form water.

Another object of the invention is to provide a wetting agent for carrying out the dry granular mix method in the manufacture of the type of abrasive articles indicated of superior quality. Another object is to avoid or prevent swelling of the abrasive article; to permit cold pressing and curing without pressure, and to avoid the formation of any water during the cure. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

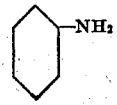

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —CH₂— groups to form a tough, heat resistant, semi-thermoplastic resin. I may add some of the formaldehyde after the initial condensation, in the form of paraformaldehyde, or by the addition of hexa-methylene-tetramine.

As examples of the halogenated organic compound, I may use any of polyvinyl chloride, polyvinylidene dichloride, rubber hydrochloride, chlorinated rubber, chlorinated polyisobutylene; any chlorine, bromine or iodine substituted paraffin hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma dichlorhydrin. Naturally enough, most of the examples are chlorinated compounds because these are cheaper and more readily available than the frominated or iodated compounds, but the latter two give effective results. The fluorinated compounds are rejected because they are too stable and will not alkylate the polymer. However, so far as the broad features of this invention are concerned, and apart from the esters hereinafter described, the halogenated organic compound may be omitted altogether.

Since the invention relates to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware.) The furfural cross links the polymer and, therefore, converts it to the "infusible" condition. A stoichiometric quantity of aniline and formaldehyde condensed in the presence of a strong acid is believed to produce a resin which is structurally represented thus:

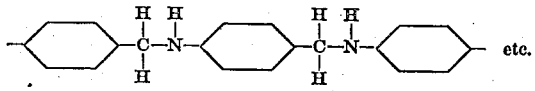

Such a resin cross-linked with furfural is believed to be represented thus:

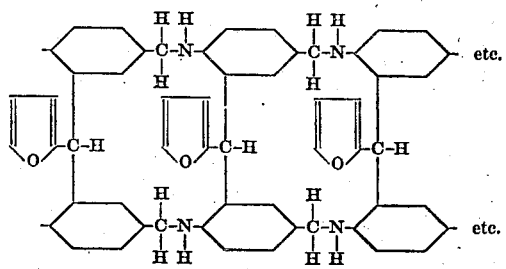

My invention consists in the use of chloracetates of glycerol chlorhydrins as the wettant-plasticizer for grinding wheels and other solid abrasive articles made out of abrasive grains bonded with aromatic-amine-aldehyde resin with or without the use of other halogented compounds, with or without other fillers, and with or without the use of other wettant-plasticizers; for example, a mixture of such a chloracetate and furfural may be used to wet the abrasive grains, but at present I prefer to use a chloracetate or mixtures of chloracetates alone. I have found that such chloracetates can be used as combined plasticizers and hardening agents for such resins.

A preferred and illustrative method of carrying out my invention may be as follows: I first prepare the chloracetate. For example, I may start with glycerol $\alpha\gamma$ dichlorhydrin and glycerol $\alpha\beta$ dichlorhydrin, which are, respectively, or may be written thus:

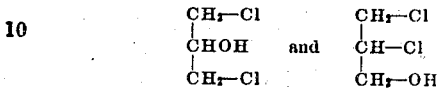

Mixtures of the above form chloracetates when reacted with chloracetic acid; such chloracetates are, respectively, or may be written thus:

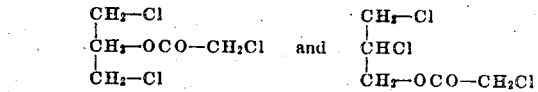

These are esters and the mixture cross-links I believe, the aniline-formaldehyde, thus:—

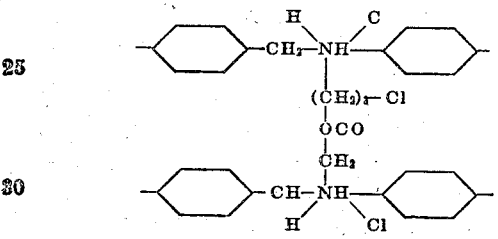

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

Grinding wheels when made according to my invention achieve a number of practical advantages and the abrasive article may be made up without having to tie up expensive hot-press equipment, and several methods, illustrations of which are later set forth, may be used where it is not desired to resort to hot-pressing. Thus the mix of resin (in powder form), abrasive grains, and chloracetate hardening agent, with or without other ingredients, fillers, or the like, may be shaped in any desired way cold, or at room temperature, and after such playing may be put in an oven for heat treatment to cure the resin and effect the bonding together of the abrasive articles. Grinding wheels made according to my invention have or may be given, in general, cutting characteristics similar to those of hard-rubber bonded wheels, and thus may be used to perform grinding operations where such hard rubber-bonded wheels are preferred or more suitable.

However, my invention consists also in the discovery that the above-mentioned esters are good solvents or plasticizers or hardening agents for amine formaldehyde resins and that thereby I am enabled to produce a resin, with or without fillers or the like, that is strong and tough and that may be used for the making of various articles, lending itself, in its intermediate stage, to ready and facile molding, shaping or otherwise conforming it to the desired configuration, and lending itself thereafter to advantageous and economical heat treatment for curing or hardening; it is, however, to be understood that, when the mix includes abrasive grains, many unique and highly advantageous features of action and coaction, both in the process and in the abrasive article itself, are achieved. Thus, for example, the esters bring to the cross-linking with the above-mentioned polymer not only hydrogen chloride, but also do so in a manner to free hydrogen chloride at the grinding line, under the heat effect produced during grinding. Moreover, the esters are good wettants for the abrasive grains and this is of great advantage in that thereby it is made certain that each grain becomes well coated by and with the particles of the powdered resin and thus there is good assurance of achieving, during the curing, good and uniform bonding of the abrasive grains, the abrasive article having thereby substantial uniformity of strength and other characteristics throughout. The abrasive wheel can thus be made free from localized mechanical weaknesses and its wear can be uniform.

There is hereinafter set forth several examples illustrating preferred methods of making grinding wheels according to certain aspects of my invention, but it may here be pointed out that those examples will also suffice to illustrate or indicate how I may achieve the production, by the above-mentioned esters, of a resin or resinous article.

Also, insofar as I am aware, the above-mentioned esters are new compositions of matter. These I may produce in any suitable way of which the following is illustrative, thus:—

130 grams of a commercial mixture of $\alpha\beta$ and $\alpha\gamma$ glycerol dichlorhydrin is mixed with 94 grams of chloracetic acid and the mixture is heated in an open flask at about 140° C. for about 8 hours. The reaction mixture is then neutralized with sodium carbonate, washed with water and finally heated at about 100° C. at reduced pressure, say, at 20 millimeters, for about 3 hours. The product is light yellow brown in color and has a slight pleasant odor. It is a good solvent for aniline formaldehyde resin.

*Example I*

525 grams of #46 grit "Alundum" abrasive grain is wet with 20 cc. of the above-mentioned product which may be termed glycerol chlorhydrin chloracetate and thereto is added, with stirring, 165 grams of a mixture, by volume, of 65% of aniline formaldehyde resin, 30% of cryolite, and 5% of soluble anhydrite, resulting in a "dry granular mix." The latter is spread in a 6" mold, where a grinding wheel is to be made, and pressed to the desired pore volume, in this instance, 15 percent. The "green" wheel is then stripped from the mold and cured in an oven. Preferably, I utilize an initial curing temperature of 95° C., gradually raising the temperature, over a period of 4 hours, to about 175° C., and then keep the temperature at 175° C. for about 2 hours, and then cool the wheel off.

*Example II*

525 grams of #80 grit "Alundum" abrasive grain is wet with 25 cc. of the above-mentioned ester and thereto is then added, with stirring, 165 grams of a mixture, by volume, of 65% of an aniline formaldehyde resin, 30% of cryolite, and 5% of soluble anhydrite, resulting in a dry granular mix.

The latter is then worked on differential mixing rolls until formed into substantially a sheet and the sheet is then passed through calendar rolls until the desired thickness is achieved, in this instance, $\frac{3}{32}$". From the resultant sheet, a 12" disk is then cut and the resultant green wheel is then heat-treated, preferably in the manner described above in Example I.

It will be understood that either of the esters or mixtures thereof may be used, following substantially the proportions of materials illustrated in the foregoing two specific examples, and whether either ester alone or the two in admixture are employed, it will be seen that, in the cross-linking with the above-mentioned polymer, the same relationships appear, including the appearance of the hydrogen chloride at the amino groups.

Wheels so made, running at a surface speed of 9500 feet per minute, when tested in grinding $\frac{3}{4}$" cold rolled steel showed an areal wheel wear of 0.043 square inch per cut when running wet and 0.075 square inch per cut when running dry.

A wheel made according to Example I was tested as a portable snagging wheel with good results; its resiliency was of such an order as to greatly facilitate manual control of the positioning or movement of the wheel and the pressure of its application and gave the wheel a free cutting and smooth action.

According to certain prior practices, difficulties are encountered during heat treatment or curing, due to the fact that swelling occurs; such swelling usually results from the formation of water and is aggravated by the conversion of water or possibly also of other constituents into vapors, under the action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

It will be understood that either of the above-mentioned esters may be used alone or they may both be used in admixture; in any such case the cross-linking is as above set forth in connection with the mixture of both esters. In the illustrations above set forth, I have used mixtures simply because of the convenience in using commercially available already-mixed glycerol dichlorhydrins of the two types; when reacted with chloracetic acid as above described, a mixture of the two chloracetates results. The illustrations above set forth are, therefore, not to be interpreted by way of limitation.

I make no claim herein to the resinous compositions or method of making the same or to the plasticizer or hardening agent inasmuch as such subject matter is disclosed and claimed in my copending application Serial No. 452,089, filed of even date herewith.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. The method of making an abrasive wheel or other abrasive article, comprising wetting abrasive grains with a combined grain-wettant and resin-hardening agent that comprises a compound taken from the group consisting of the reaction product with chloracetic acid of glycerol $\alpha\gamma$ dichlorhydrin, the reaction product with chloracetic acid of glycerol $\alpha\beta$ dichlorhydrin and a mixture thereof, admixing therewith amine formaldehyde resin to produce a dry granular mix, giving the mix the desired configuration and heat-treating it at resin-curing temperature.

2. The method of making an abrasive wheel or other abrasive article, comprising wetting abrasive grains with a combined grain-wettant and resin-hardening agent that comprises a compound taken from the group consisting of the reaction product with chloracetic acid of glycerol $\alpha\gamma$ dichlorhydrin, the reaction product with chloracetic acid of glycerol $\alpha\beta$ dichlorhydrin and a mixture thereof, admixing therewith amine formaldehyde resin to produce a dry granular mix, molding the mix in a mold, removing it from the mold, and heat-treating it at resin-curing temperature.

3. The method of making an abrasive wheel or other abrasive article, comprising wetting abrasive grains with a combined grain-wettant and resin-hardening agent that comprises a compound taken from the group consisting of the reaction product with chloracetic acid of glycerol $\alpha\gamma$ dichlorhydrin, the reaction product with chloracetic acid of glycerol $\alpha\beta$ dichlorhydrin and a mixture thereof, admixing therewith amine formaldehyde resin to produce a dry granular mix, working the mix into substantially sheet form and then giving it the desired configuration of the abrasive article, and then heat-treating it at resin-curing temperature.

4. A grinding wheel or other abrasive article comprising abrasive grains bonded together by a bond that comprises the reaction product, under heat treatment, of amine formaldehyde resin and a hardening agent comprising a compound selected from the group consisting of the reaction product with chloracetic acid of glycerol $\alpha\gamma$ dichlorhydrin, the reaction product with chloracetic acid of glycerol $\alpha\beta$ dichlorhydrin and a mixture thereof.

5. A grinding wheel or other abrasive article comprising abrasive grains bonded together by a bond that comprises the reaction product, under heat treatment, of a resin-hardening agent comprising a compound selected from the group consisting of the reaction product with chloracetic acid of glycerol $\alpha\gamma$ dichlorhydrin, the reaction product with chloracetic acid of glycerol $\alpha\beta$ dichlorhydrin and a mixture thereof, which hardening agent is also a grain-wettant and wets the abrasive grains initially, and aniline formaldehyde resin.

6. A grinding wheel or other abrasive body comprising abrasive grains bonded with a resin bond that comprises the reaction product of resin and a plasticizer and hardening agent comprising a compound selected from the group consisting of the reaction product with chloracetic acid of glycerol $\alpha\gamma$ dichlorhydrin, the reaction product with chloracetic acid of glycerol $\alpha\beta$ dichlorhydrin and a mixture thereof.

7. The method of making a grinding wheel or other abrasive body comprising making a mix comprising abrasive grain and resin and a grain-wetting and resin-hardening agent comprising a compound selected from the group consisting of the reaction product with chloracetic acid of glycerol $\alpha\gamma$ dichlorhydrin, the reaction product with chloracetic acid of glycerol $\alpha\beta$ dichlorhydrin and a mixture thereof, and shaping and curing the mix.

8. The method of making a grinding wheel or other abrasive body comprising making a mix comprising abrasive grain and resin and a grain-wetting and resin-hardening agent comprising a compound selected from the group consisting of the reaction product with chloracetic acid of glycerol $\alpha\gamma$ dichlorhydrin, the reaction product with chloracetic acid of glycerol $\alpha\beta$ dichlorhydrin and a mixture thereof, working the mix on mill rolls, then calendering into substantially sheet form to the desired thickness, cutting out of the sheet form the desired configuration of abrasive article, and then curing at resin-curing temperature.

LORING COES, Jr.